(12) United States Patent
Nishita

(10) Patent No.: US 11,460,299 B2
(45) Date of Patent: Oct. 4, 2022

(54) SURVEY SYSTEM

(71) Applicant: TOPCON CORPORATION, Tokyo (JP)

(72) Inventor: Nobuyuki Nishita, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 1065 days.

(21) Appl. No.: 16/122,028

(22) Filed: Sep. 5, 2018

(65) Prior Publication Data

US 2019/0086206 A1 Mar. 21, 2019

(30) Foreign Application Priority Data

Sep. 20, 2017 (JP) .............................. JP2017-179701

(51) Int. Cl.

| | |
|---|---|
| *G01C 11/02* | (2006.01) |
| *B64C 39/02* | (2006.01) |
| *B64D 47/08* | (2006.01) |
| *G01C 11/30* | (2006.01) |
| *G01S 17/89* | (2020.01) |

(Continued)

(52) U.S. Cl.

CPC ............ *G01C 11/02* (2013.01); *B64C 39/024* (2013.01); *B64D 47/08* (2013.01); *G01C 11/30* (2013.01); *G01C 15/002* (2013.01); *G01S 17/42* (2013.01); *G01S 17/66* (2013.01); *G01S 17/86* (2020.01); *G01S 17/87* (2013.01); *G01S 17/89* (2013.01); *G05D 1/0094* (2013.01);

(Continued)

(58) Field of Classification Search

CPC ...... G01C 11/02; G01C 11/30; G01C 15/002; B64C 39/024; B64C 2201/123; B64C 2201/127; B64C 2201/145; B64D 47/08; G01S 17/42; G01S 17/66; G01S 17/86; G01S 17/87; G01S 17/89; G05D 1/0094

USPC ........................................................ 356/4.01

See application file for complete search history.

(56) References Cited

U.S. PATENT DOCUMENTS

| | | | | |
|---|---|---|---|---|
| 9,201,424 | B1 * | 12/2015 | Ogale | ........................ G06T 7/80 |
| 2009/0119050 | A1 * | 5/2009 | Hayashi | ................. G01C 11/06 |
| | | | | 702/94 |

(Continued)

FOREIGN PATENT DOCUMENTS

| | | |
|---|---|---|
| JP | 2015-145784 A | 8/2015 |
| WO | WO-2013171912 A1 * | 11/2013 ............. G01C 11/06 |

*Primary Examiner* — Elaine Gort
*Assistant Examiner* — Ellis B. Ramirez
(74) *Attorney, Agent, or Firm* — Roberts Calderon Safran & Cole P.C.

(57) ABSTRACT

Provided is a survey system capable of more highly accurately obtaining a product of a three-dimensional survey. A survey system includes a mobile body, a scanner including an emitting unit, a light receiving unit, a distance measuring unit, a first optical axis deflecting unit disposed on an optical axis of the distance measuring light and configured to deflect a distance measuring light, a second optical axis deflecting unit disposed on a light receiving optical axis of the reflected distance measuring light and configured to deflect a reflected distance measuring light at the same angle in the same direction as those of the first optical axis deflecting unit, and an emitting direction detecting unit to detect deflection angles and directions of the first and the second optical axis deflecting units, a posture detecting device of the scanner, and a position measuring device of the scanner.

2 Claims, 14 Drawing Sheets

(51) Int. Cl.
*G01C 15/00* (2006.01)
*G01S 17/87* (2020.01)
*G01S 17/66* (2006.01)
*G01S 17/42* (2006.01)
*G05D 1/00* (2006.01)
*G01S 17/86* (2020.01)

(52) U.S. Cl.
CPC .. *B64C 2201/123* (2013.01); *B64C 2201/127* (2013.01); *B64C 2201/145* (2013.01)

(56) References Cited

U.S. PATENT DOCUMENTS

| | | | |
|---|---|---|---|
| 2014/0046589 A1* | 2/2014 | Metzler | G01C 15/004 356/3.09 |
| 2015/0254861 A1* | 9/2015 | Chornenky | G01C 15/00 348/135 |
| 2016/0238708 A1* | 8/2016 | Ohtomo | G01C 9/06 |
| 2018/0023974 A1* | 1/2018 | Otani | G01C 23/00 701/3 |

* cited by examiner

SURVEY SYSTEM

TECHNICAL FIELD

The present invention relates to a survey system that acquires three-dimensional data of a survey site.

BACKGROUND ART

In recent years, three-dimensional surveys of survey sites are frequently performed. For example, Patent Literature 1 discloses a survey system that, by using a mobile body equipped with a camera and a prism, and a total station (an electronic distance measuring and angle measuring instrument, hereinafter, referred to as a surveying instrument), performs a photographic survey by identifying a photographing position of the camera by tracking the prism by the surveying instrument.

CITATION LIST

Patent Literature

[Patent Literature 1] Japanese Published Unexamined Patent Application No. 2015-145784

SUMMARY OF THE INVENTION

Technical Problem

However, in the survey system disclosed in Patent Literature 1, unless an illuminance of the camera was secured, data omission occurred in a product (three-dimensional map or the like) obtained through a photographic survey.

Solution to Problem

In order to solve the problem described above, a survey system according to an aspect of the present invention includes a mobile body, a scanner including an emitting unit configured to emit a distance measuring light, a light receiving unit configured to receive a reflected distance measuring light, a distance measuring unit configured to perform a distance measurement based on an output of the light receiving unit, a first optical axis deflecting unit disposed on an optical axis of the distance measuring light and configured to deflect the distance measuring light, a second optical axis deflecting unit disposed on a light receiving optical axis of the reflected distance measuring light and configured to deflect the reflected distance measuring light at the same angle in the same direction as those of the first optical axis deflecting unit, and an emitting direction detecting unit configured to detect a deflection angle and a direction of the first optical axis deflecting unit and the second optical axis deflecting unit, a posture detecting device configured to detect a posture of the scanner, and a position measuring device configured to measure a position of the scanner.

In the aspect described above, it is also preferable that the posture detecting device is an inertial measurement unit configured to detect triaxial accelerations and angular velocities of the scanner, and the position measuring device is a GPS device.

In the aspect described above, it is also preferable that the posture detecting device is an inertial measurement unit configured to detect triaxial accelerations and angular velocities of the scanner, and the position measuring device is a surveying instrument configured to track a prism attached to the mobile body.

In the aspect described above, it is also preferable that the posture detecting device is a camera for photographically analyzing a posture of the scanner, and the posture measuring device is a surveying instrument configured to track a prism attached to the mobile body.

Effect of the Invention

With the survey system of the present invention, a product of a three-dimensional survey can be more accurately obtained.

DESCRIPTION OF EMBODIMENTS

Next, preferred embodiments of the present invention are described with reference to the drawings.

First Embodiment

Figure 1A:
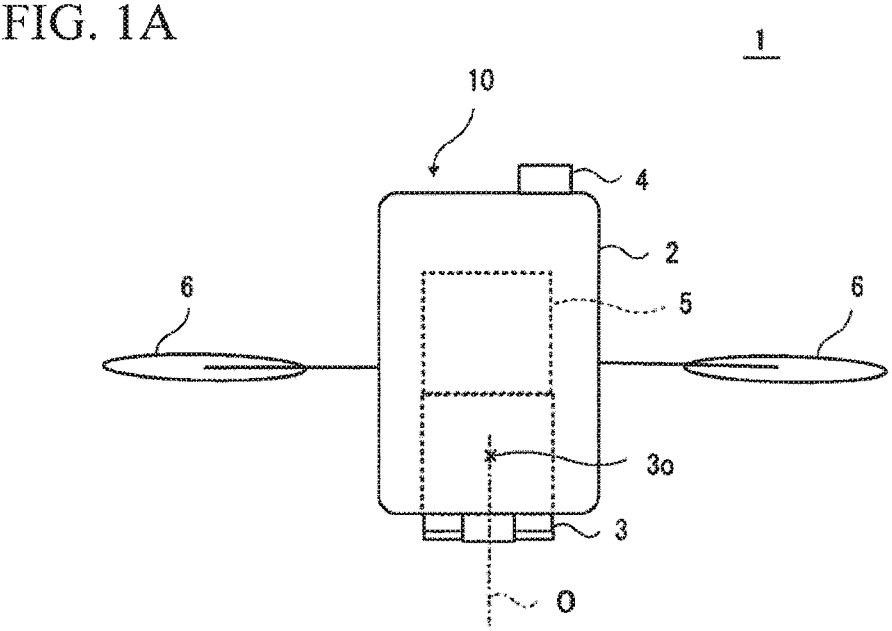
FIG. 1A is a side view of a survey system according to a first embodiment.
Figure 1B:
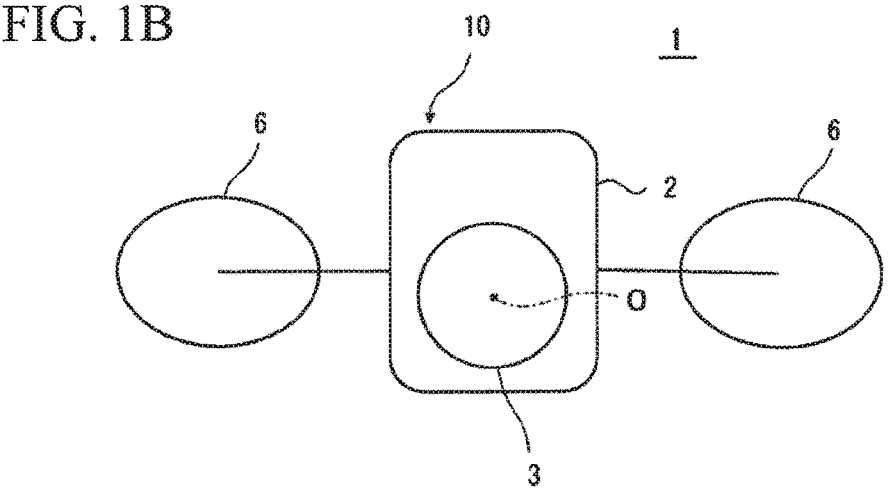
FIG. 1B is a bottom view of the same system.

FIG. 1 are configuration diagrams of a survey system 1 according to a first embodiment, FIG. 1A is a side view of the same system 1, and FIG. 1B is a bottom view of the same system. The survey system 1 is a surveying moving device 10 including a mobile body 2, a scanner 3, a GPS device 4, and an IMU 5.

The mobile body 2 is a UAV (Unmanned Air Vehicle) capable of autonomous flying. The mobile body 2 includes a plurality of propellers 6 extending radially and a flying unit not illustrated in the drawings, and can fly along a flight path determined in advance, and can freely fly by being remotely controlled.

The GPS device 4 is fixed to the mobile body 2, and receives a signal from a GPS satellite and acquires a UTC, a latitude, and a longitude. The GPS device 4 functions as a position measuring device to measure a position of the scanner 3.

The IMU (Inertial Measurement Unit) 5 is incorporated in the mobile body 2, includes a 3-axis gyro and a 3-axis acceleration sensor, and acquires angular velocities and accelerations in 3-axis directions (roll, pitch, and yaw) of the scanner 3. The IMU 5 functions as a posture detecting device to detect a posture of the scanner 3.

The scanner 3 transmits a laser distance measuring light to measure a three-dimensional position of each scanning point. In the scanner 3, at each of the light emitting unit and the light receiving unit, an optical axis deflecting unit including Risley prisms is disposed, and can deflect the distance measuring light in an arbitrary direction. A reference optical axis O of the scanner 3 is provided so as to be positioned vertically downward when the mobile body 2 is in a horizontal posture (refer to FIG. 1A). The reference sign 3$o$ denotes a measurement reference point of the scanner 3 on the reference optical axis O.

Figure 2:
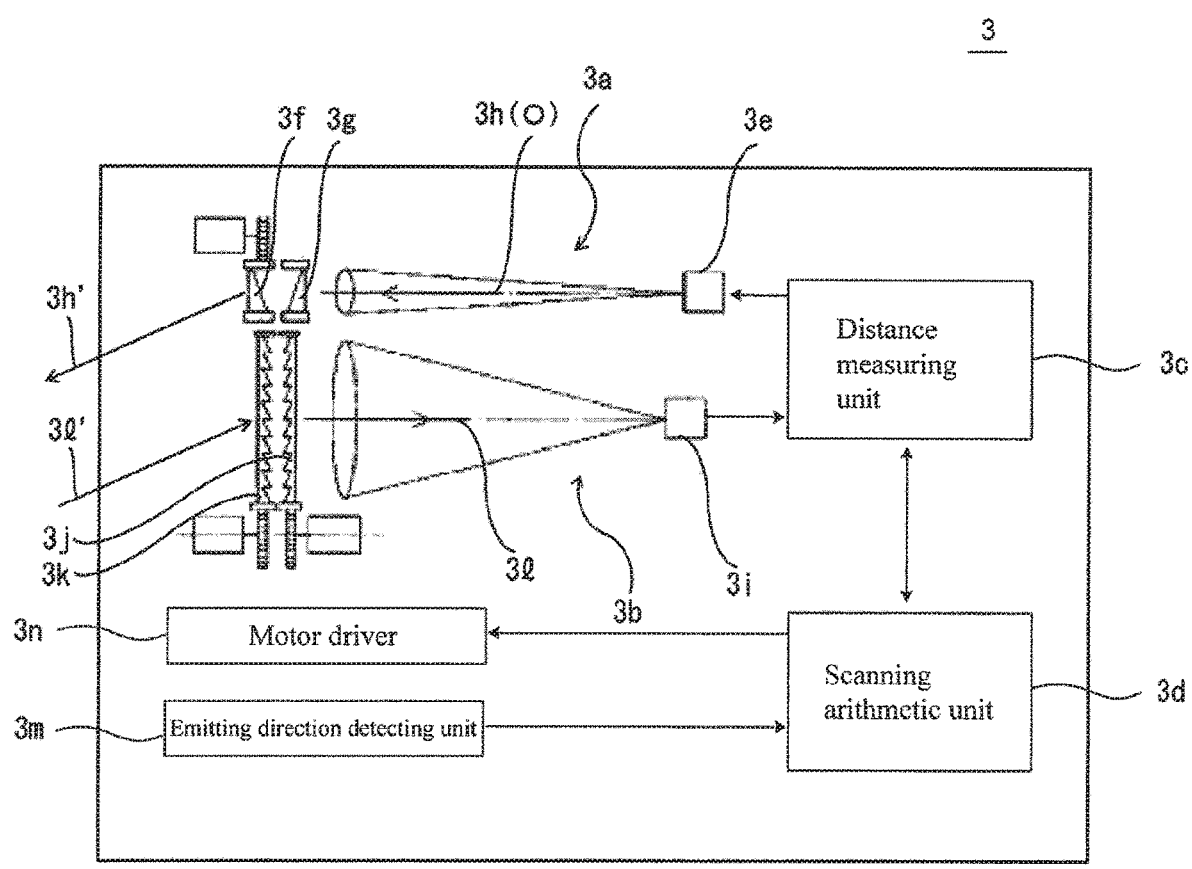
FIG. 2 is a configuration block diagram of a Fresnel scanner equipped in the survey system according to the first embodiment.

FIG. 2 is a configuration block diagram of the scanner 3. The scanner 3 includes an emitting unit 3$a$, a light receiving unit 3$b$, a distance measuring unit 3$c$, a scanning arithmetic unit 3$d$, and an emitting direction detecting unit 3$m$. The emitting unit 3$a$ includes a light emitting element 3$e$ and a pair of Risley prisms 3$f$ and 3$g$. From the light emitting element 3$e$, a distance measuring light 3$h'$ is emitted. The Risley prisms 3$f$ and 3$g$ face each other while centering on an optical axis 3$h$ of the distance measuring light, and can be rotated independently of each other by a motor driver 3$n$. The Risley prisms 3$f$ and 3$g$ function as a first optical axis deflecting unit to deflect the distance measuring light 3$h'$. The light receiving unit 3$b$ includes a light receiving element 3$i$ and a pair of Fresnel prisms 3$j$ and 3$k$ including a plurality of Risley prisms continuous with each other. The light receiving element 3$i$ receives a reflected distance measuring light from a scanning point. The Fresnel prisms 3$j$ and 3$k$ face each other while centering on an optical axis 3$l$ of the reflected measuring light 3$l'$, and can be rotated independently of each other by the motor driver 3$n$. The Fresnel prisms 3$j$ and 3$k$ function as a second optical axis deflecting unit to deflect the reflected distance measuring light 3$l'$. In FIG. 2, the first optical axis deflecting unit is disposed on an emission side, and the second optical axis deflecting unit is disposed on a light receiving side, however, a configuration in which an optical axis deflecting unit is shared by the emission side and the light receiving side may be adopted.

The distance measuring unit 3$c$ transmits a distance measuring light 3$h'$, and acquires a distance to each scanning point by measuring a round-trip time of the distance measuring light 3$h'$ based on a light receiving signal of the light receiving element 3$i$. The emitting direction detecting unit 3$m$ counts drive pulses input to the motor driver 3$n$ or uses an encoder to detect rotation directions, rotation amounts, and rotation speeds of the Risley prisms 3$f$ and 3$g$. By passing through the Risley prisms 3$f$ and 3$g$, the distance measuring light 3$h'$ is deflected in an arbitrary direction. The scanning arithmetic unit 3$d$ obtains refractive indexes and rotation angles of the Risley prisms 3$f$ and 3$g$ from the emitting direction detecting unit 3$m$, and based on these, calculates a deflection angle and direction of the distance measuring light 3$h'$.

The emitting direction detecting unit 3$m$ detects rotation directions, rotation amounts, and rotation speeds of the Fresnel prisms 3$j$ and 3$k$ in the same manner. The scanning arithmetic unit 3$d$ performs control so that the deflection angles and directions of the Fresnel prisms 3$j$ and 3$k$ are always the same as those of the Risley prisms 3$f$ and 3$g$. By passing through the Fresnel prisms 3$j$ and 3$k$, the reflected distance measuring light 3$l'$ is deflected so as to match the light receiving optical axis 3$l$.

With the configuration described above, the scanner 3 can arbitrarily deflect the deflection angle and direction of the distance measuring light 3$h'$ in accordance with a combination of rotational positions of the Risley prisms 3$f$ and 3$g$, and acquire three-dimensional point group data of scanning points. By integrally rotating the Risley prisms 3$f$ and 3$g$ in a state where a positional relationship between the Risley prisms 3$f$ and 3$g$ is fixed, the distance measuring light 3$h'$ can be scanned, for example, in a circular form around a deflection reference axis O' (refer to FIG. 3 described below).

Figure 3:
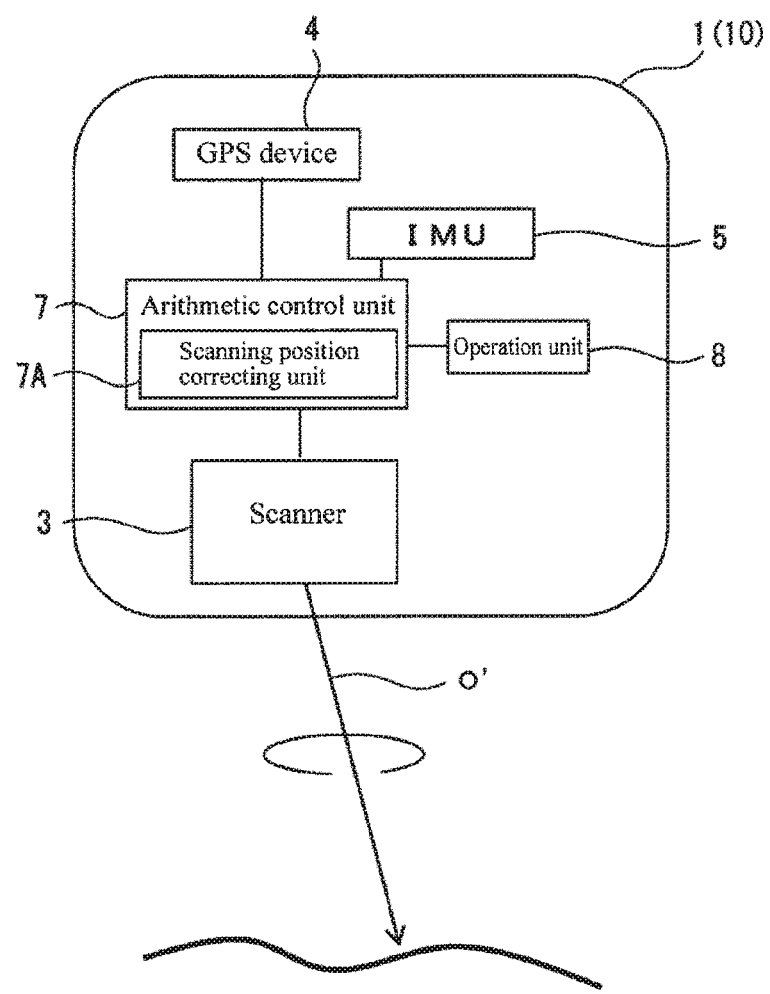
FIG. 3 is a control block diagram of the survey system according to the first embodiment.

FIG. 3 is a control block diagram of the survey system 1. The survey system 1 includes the above-described scanner 3, GPS device 4, and IMU 5, and an arithmetic control unit 7 and an operation unit 8. From the operation unit 8, various operation commands and settings can be input to the arithmetic control unit 7.

The arithmetic control unit 7 is, for example, a microcontroller including a CPU, a ROM, and a RAM, etc., mounted on an integrated circuit. The arithmetic control unit 7 controls a flying unit not illustrated in the drawings, and acquires three-dimensional point group data (distances and angles to scanning points) from the scanner 3, acquires positional information (a latitude and a longitude) of the scanner 3 from the GPS device 4, and acquires posture information (a roll angle, a pitch angle, and a yaw angle) of the scanner 3 from the IMU 5. To each of the three-dimensional point group data and the positional information and posture information of the scanner, at the timing of outputting a light transmission signal of the scanner 3, time information by the GPS device 4 is provided. Based on the time information, the arithmetic control unit 7 records the three-dimensional point group data obtained by the scanner 3, the positional information of the scanner obtained by the GPS device 4, and the posture information of the scanner obtained by the IMU 5 in association with each other. The arithmetic control unit 7 further includes a scanning position correcting unit 7A that corrects a three-dimensional position obtained by the scanner 3 by a position and a posture of the scanner. This is described in detail below.

Figure 4:
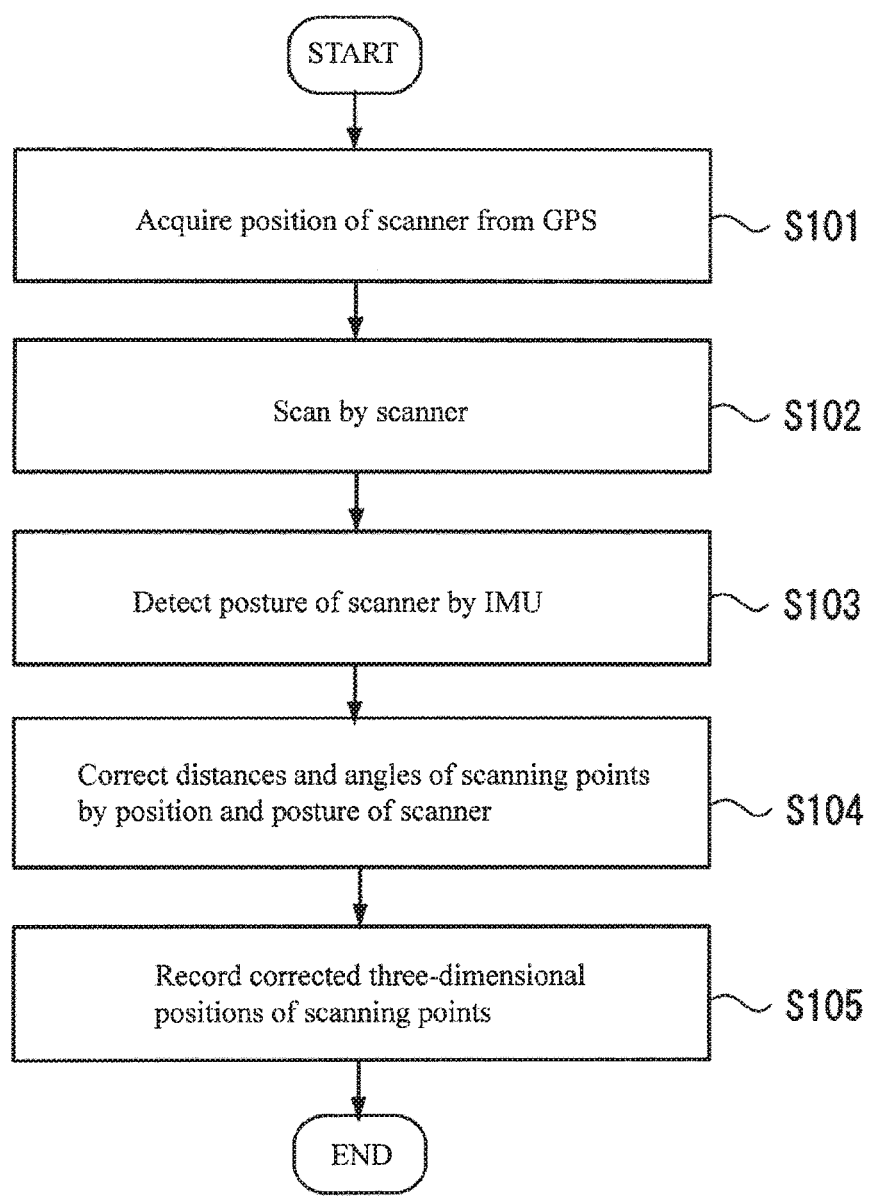
FIG. 4 is an operation flowchart of the survey system according to the first embodiment.

Next, an operation flow of the survey system 1 is described with reference to FIG. 4.

First, in Step S101, the arithmetic control unit of the survey system 1 acquires a three-dimensional position (absolute coordinates) from the GPS device 4. The GPS device 4 and the scanner 3 are integrated together, so that positional information acquired by the GPS device 4 can be regarded as a position of the scanner.

Next, in Step S102, in parallel with Step S101, the scanner 3 performs a distance measurement and an angle measurement to measure a three-dimensional position of each scanning point.

Next, in Step S103, in parallel with Steps S101 and S102, the IMU 5 detects a posture (a roll angle, a pitch angle, and a yaw angle) of the scanner.

Next, in Step S104, the arithmetic control unit associates the positional information of the scanner obtained from the GPS device 4 in Step S101, the three-dimensional point group data of scanning points obtained from the scanner 3 in Step S102, and the posture information of the scanner obtained from the IMU 5 in Step S103 with each other by time. Then, the scanning position correcting unit 7A corrects the three-dimensional positions of the scanning points obtained in Step S102 by the position and posture of the scanner.

In detail, a position of the scanner 3 is acquired as absolute coordinates in Step S101. In Step S103, an inclination (posture) of the scanner 3 is known. Therefore, the scanning position correcting unit 7A corrects the reference optical axis O of the scanner to a posture direction of the scanner, and re-calculates a distance and an angle to each scanning point measured by the scanner 3 by setting the coordinates obtained by the GPS device 4 as a measurement reference point 3o of the scanner.

Last, in Step S105, the arithmetic control unit 7 stores the three-dimensional positions (absolute coordinates) of the scanning points corrected in Step S104, and ends the operation.

With the survey system 1 described above, the following effect is obtained. In the survey system 1, the scanner 3 (laser scanner) is used, so that data omission due to an illuminance does not occur in a product of a three-dimensional survey.

Figure 5A:
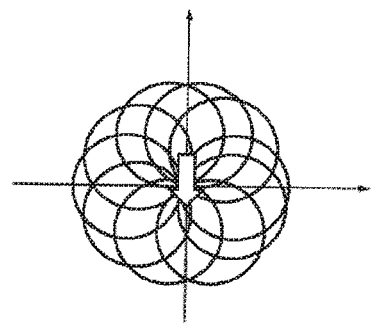
FIG. 5A is an image diagram illustrating an example of scanning loci capable of being performed by the survey system according to the first embodiment.
Figure 5B:
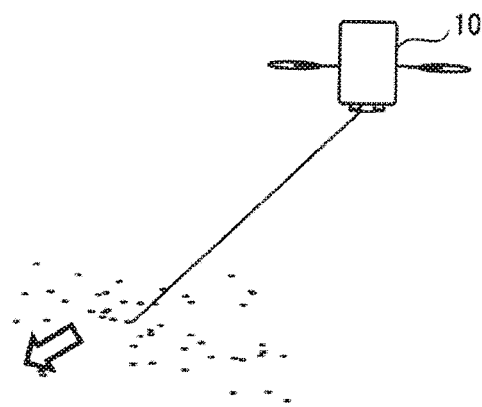
FIG. 5B is an image diagram of a three-dimensional measurement obtained through the same scanning.
Figure 5C:
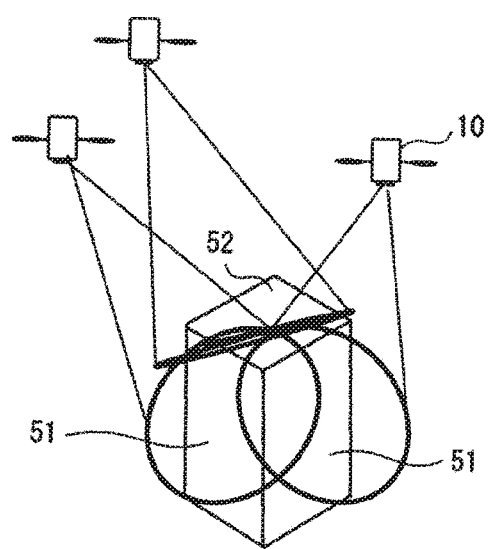
FIG. 5C is another image diagram of a three-dimensional measurement obtained through the same scanning.

With use of the survey system 1, the distance measuring light 3h' can be freely deflected by the scanner 3, so that by rotating the distance measuring light 3h' at a high speed, two-dimensional circular scanning as illustrated in FIG. 5A can be performed (the arrow in the figure illustrates an advancing direction of the mobile body 2). By high-speed deflection, as illustrated in FIG. 5B, three-dimensional point group data of random points can be obtained, so that plants, etc., in the survey site can also be measured. Alternatively, as illustrated in FIG. 5C, by turning the scanner toward a structure desired to be scanned and scanning this, the scanner 3 can irradiate a distance measuring light onto not only an upper surface 52 but also a side surface 51 of the structure as compared with a line scanner that irradiates a distance measuring light onto only the upper surface 52 of the structure (one-dimensional scanning). Therefore, at the time of a three-dimensional survey of a survey site, data omission in a product of the survey can be reduced. The above-described scanning is just an example, and the scanner 3 can perform line scanning and other arbitrary scanning.

Second Embodiment

Figure 6:
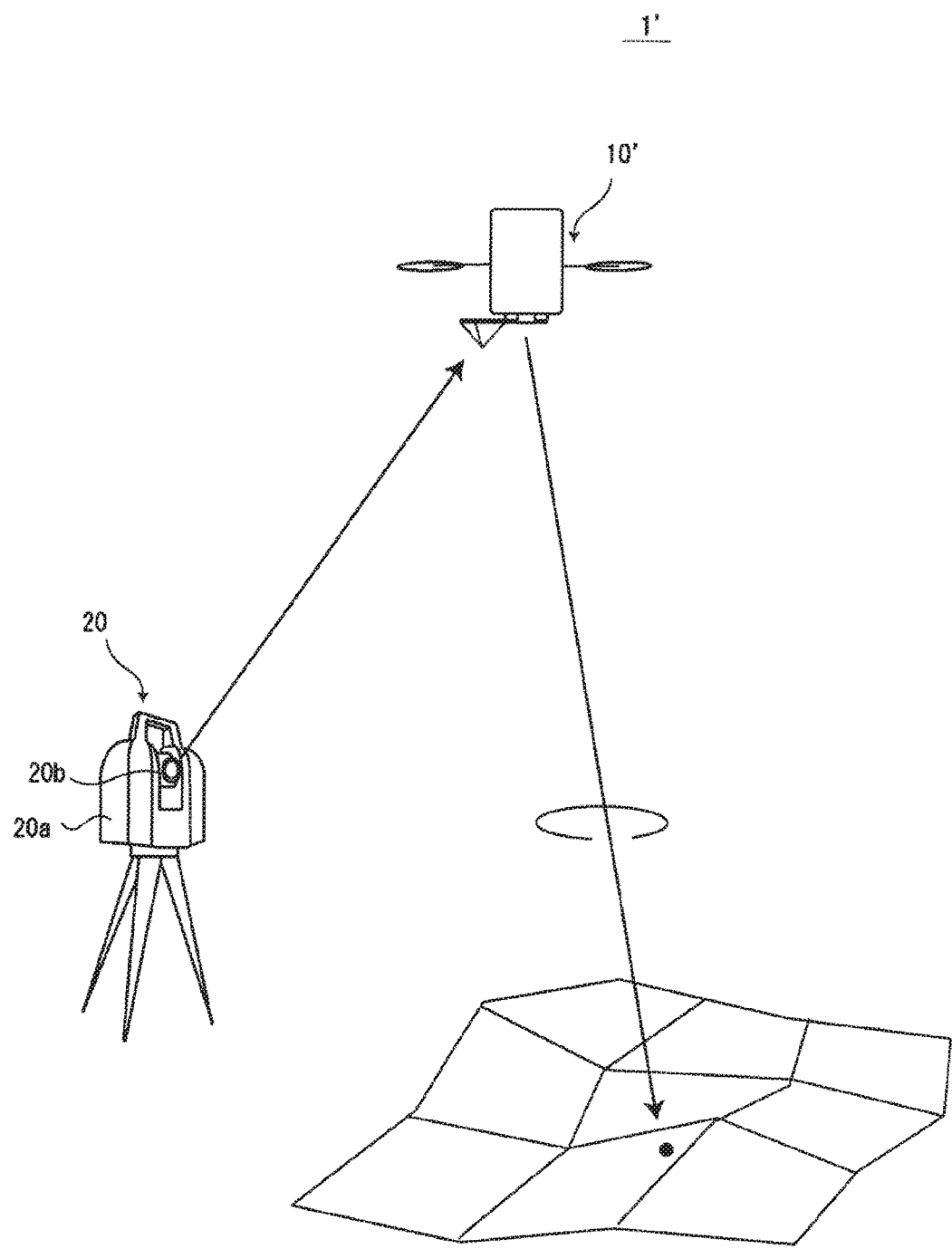
FIG. 6 is an entire configuration diagram of a survey system according to a second embodiment.
Figure 7A:
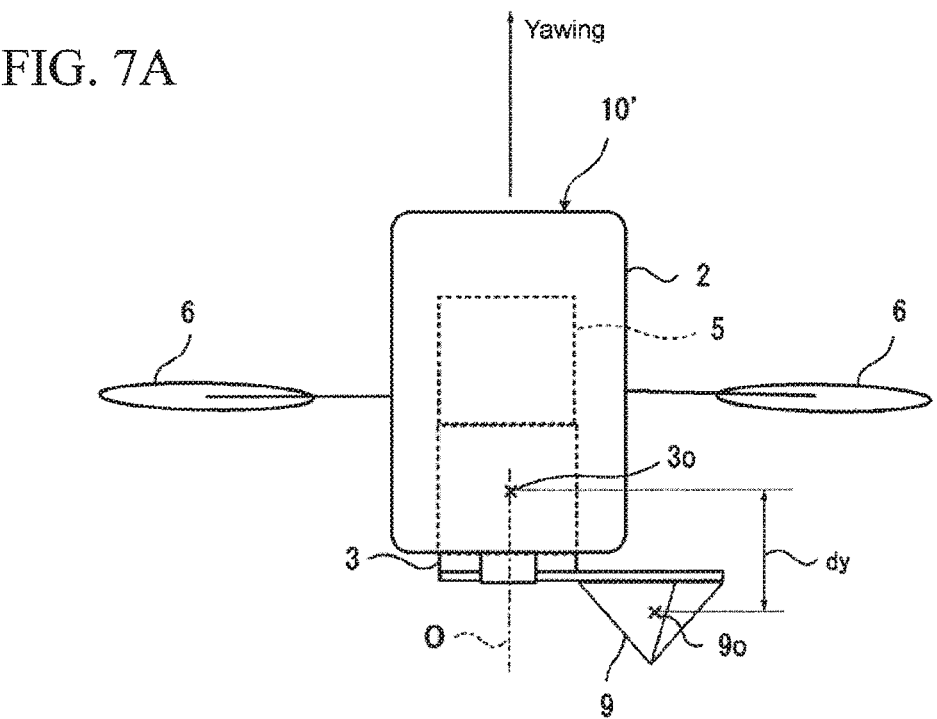
FIG. 7A is a side view of a surveying moving device according to the second embodiment.
Figure 7B:
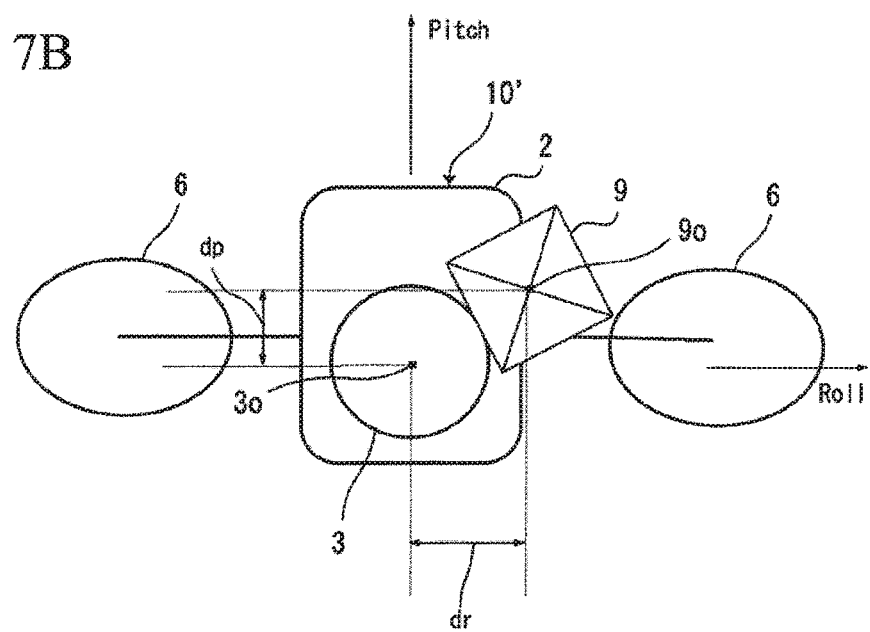
FIG. 7B is a bottom view of the same device.

Hereinafter, the same components as in the first embodiment are designated by the same reference signs, and descriptions thereof are omitted. FIG. 6 is an entire configuration diagram of a survey system 1' according to a second embodiment, FIG. 7 are configuration diagrams of a surveying moving device of the survey system 1', FIG. 7A is a side view of the same device, and FIG. 7B is a bottom view of the same device. As illustrated in FIG. 6, the survey system 1' includes a surveying moving device 10' and a surveying instrument 20.

As illustrated in FIG. 7A, the surveying moving device 10' includes the mobile body 2, the scanner 3, the IMU 5, and a prism 9 that becomes a target of the surveying instrument 20. In the present embodiment, the prism 9 is fixed to a lateral side of a tip end of a lens portion of the scanner 3. The fixation position of the prism 9 may be a position other than this, however, deviations (dr, dp, and dy) in roll axis, pitch axis, and yaw axis directions between the measurement reference point 3o of the scanner and an optical center (optical reflection point) 9o of the prism 9 are made known in advance of attachment of the prism 9.

The surveying instrument 20 is a total station capable of automatically tracking a target, and includes a main body 20a that rotates horizontally, and a telescope 20b provided vertically rotatably on the main body 20a (FIG. 6). The surveying instrument 20 is mounted at a known point by using a tripod. In the present embodiment, the surveying instrument 20 functions as a position measuring device to measure a position of the scanner 3.

Figure 8:
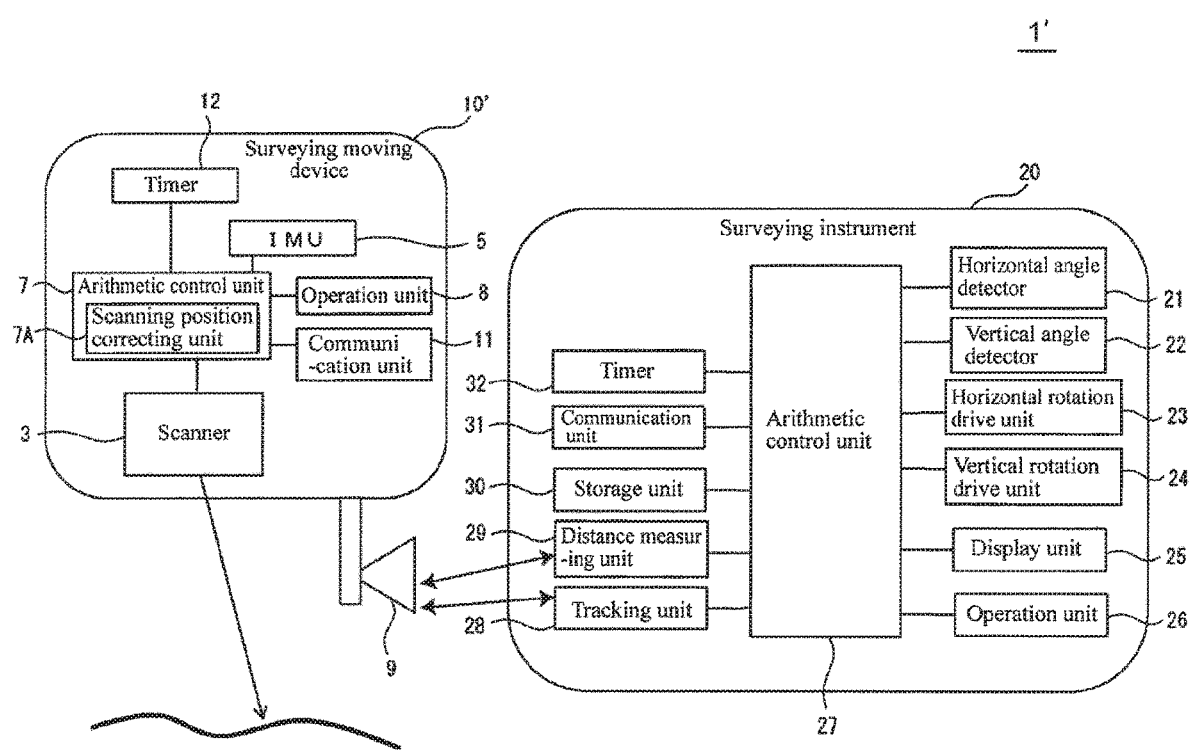
FIG. 8 is a control block diagram of the survey system according to the second embodiment.

FIG. 8 is a control block diagram of the survey system 1'. The surveying moving device 10' includes the scanner 3, the IMU 5, the arithmetic control unit 7, the operation unit 8, a communication unit 11, and a timer 12. The arithmetic control unit 7 acquires three-dimensional point group data (distances and angles to scanning points) from the scanner 3, and acquires posture information (a roll angle, a pitch angle, and a yaw angle) of the scanner 3 from the IMU 5. The arithmetic control unit 7 acquires a system time from the timer 12 at the timing of outputting a light transmission signal of the scanner 3, and provides the time to the three-dimensional point group data and the posture information of the scanner. The scanning position correcting unit 7A corrects a three-dimensional position obtained by the scanner 3 by a position and posture of the scanner. This is described in detail below.

The surveying instrument 20 includes a horizontal angle detector 21, a vertical angle detector 22, a horizontal rotation drive unit 23, a vertical rotation drive unit 24, a display unit 25, an operation unit 26, an arithmetic control unit 27, a tracking unit 28, a distance measuring unit 29, a storage unit 30, a communication unit 31, and a timer 32.

The horizontal rotation drive unit 23 and the vertical rotation drive unit 24 are motors, and are controlled by the arithmetic control unit 27 and respectively drive a horizontal rotary shaft and a vertical rotary shaft. The display unit 25 and the operation unit 26 are interfaces of the surveying instrument 20, and through these, commanding and setting of a survey work and confirmation of a work situation and measurement results can be performed. The horizontal angle detector 21 and the vertical angle detector 22 are absolute encoders or incremental encoders. The horizontal angle detector 21 is provided for the horizontal rotary shaft and detects a rotation angle in the horizontal direction of the main body 20a. The vertical angle detector 22 is provided for the vertical rotary shaft and detects a rotation angle in the vertical direction of the telescope 20b.

The tracking unit 28 includes a tracking light transmission system that emits, as a tracking light, an infrared laser or the like with a wavelength different from that of a distance measuring light, and a tracking light receiving system including an image sensor such as a CCD sensor or a CMOS sensor. The tracking unit 28 acquires a landscape image including a tracking light and a landscape image from which the tracking light is excluded, and transmits both of these images to the arithmetic control unit 27. The arithmetic control unit 27 obtains a center of a target image from a difference between these images, detects a position at which a deviation between the center of the target image and a center of a visual axis of the telescope 20b falls within a certain value as the position of a target, and performs automatic tracking so that the telescope 20b always faces the target.

The distance measuring unit 29 includes a distance measuring light transmission system that emits a distance measuring light such as an infrared laser to a target, and a distance measuring light receiving system that receives a reflected distance measuring light by a photodiode, etc. The distance measuring unit 29 receives a reflected distance measuring light from a target by the distance measuring light receiving system and divides and receives a part of the distance measuring light as an internal reference light, and measures a distance to the target based on a phase difference between the reflected distance measuring light and the internal reference light. In addition, the distance measuring unit measures an angle to the target from detected values of the horizontal angle detector 21 and the vertical angle detector 22.

The arithmetic control unit 27 is, for example, a microcontroller including a CPU, a ROM, and a RAM, etc., mounted on an integrated circuit, and controls the rotation drive units 23 and 24 and controls the distance measuring unit 29 and the tracking unit 28. The arithmetic control unit 27 acquires a system time from the timer 32 at the timing of outputting a light transmission signal of the distance measuring unit 29, and provides the time to the distance measurement and angle measurement values. The storage unit 30 is, for example, a hard disk drive, and stores various programs for the arithmetic control described above. A target position (distance and angle) acquired by the distance measuring unit 29 is stored together with time information in the storage unit 30. The communication unit 31 can make wireless communication with the communication unit 11 of the surveying moving device 10', and transmits the target position stored in the storage unit 30 to the surveying moving device 10' under control of the arithmetic control unit 27.

Figure 9:
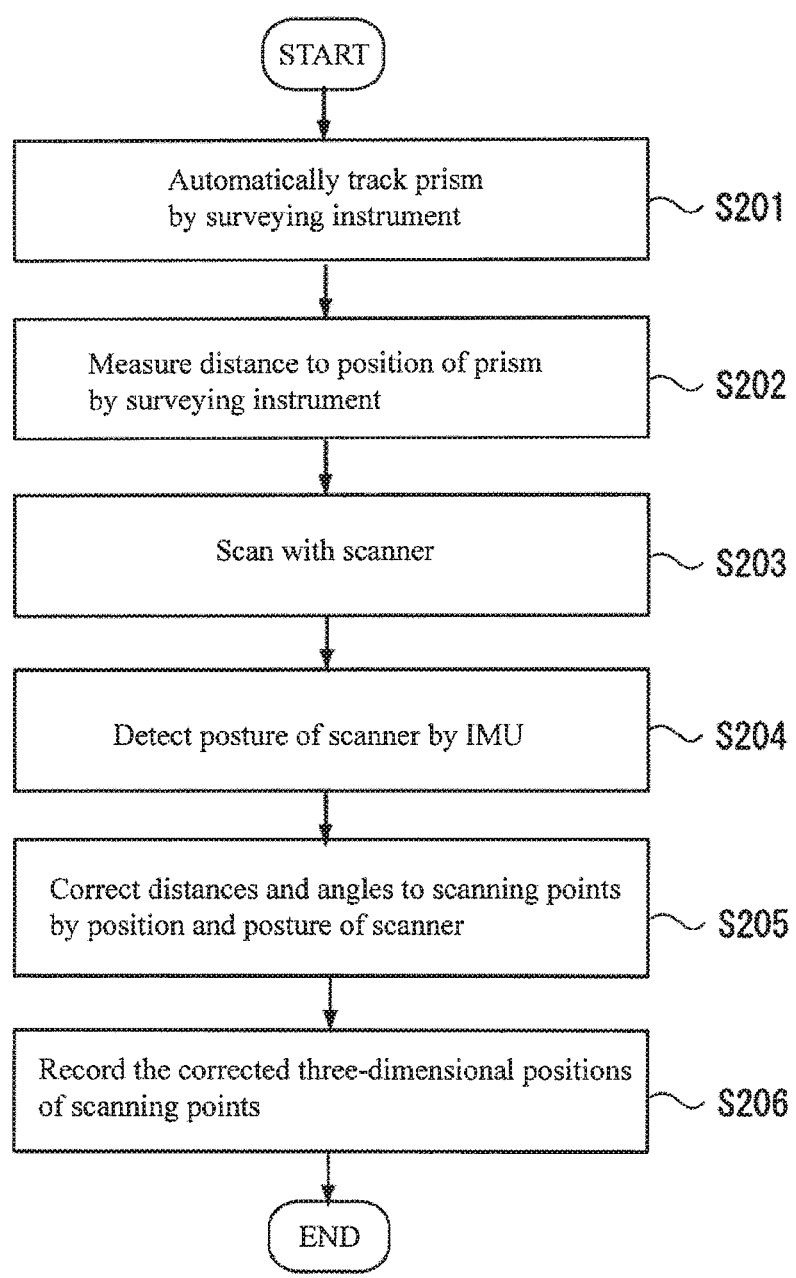
FIG. 9 is an operation flowchart of the survey system according to the second embodiment.

Next, an operation flow of the survey system 1' is described with reference to FIG. 9.

First, in Step S201, the surveying instrument 20 starts automatic tracking of the prism 9 of the surveying moving device 10'.

Next, in Step S202, the surveying instrument 20 measures a distance and an angle to an automatically tracked position by the distance measuring unit 20 to measure a three-dimensional position (absolute coordinates) of the prism 9. The surveying instrument 20 transmits the three-dimensional position of the prism 9 to the surveying moving device 10'.

Next, in Step S203, in parallel with Steps S201 and S202, the surveying moving device 10' performs a distance measurement and an angle measurement by the scanner 3 to measure three-dimensional positions of scanning points.

Next, in Step S204, in parallel with Steps S201 to S203, the surveying moving device 10' detects a posture (a roll angle, a pitch angle, and a yaw angle) of the scanner from the IMU 5.

Next, in Step S205, the arithmetic control unit 7 of the surveying moving device 10' associates the positional information of the prism 9 obtained from the surveying instrument 20 in Step S202, the three-dimensional point group data of the scanning points obtained from the scanner 3 in Step S203, and the posture information of the scanner obtained from the IMU 5 in Step S204 with each other by time. Then, the scanning position correcting unit 7A corrects the three-dimensional positions of the scanning points obtained in Step S203 by the position and posture of the scanner.

In detail, in Step S202, the position of the prism 9 is precisely measured as absolute coordinates by the surveying instrument 20. In Step S204, an inclination (posture) of the scanner 3 is known. Therefore, the scanning position correcting unit 7A corrects the reference optical axis O of the scanner to a posture direction of the scanner, and re-calculates a distance and an angle to each scanning point measured by the scanner 3 by setting coordinates moved by the respective deviations (dr, dp, dy) from the coordinates of the prism 9 as a measurement reference point 3o of the scanner.

Last, in Step S206, the measuring moving device 10' stores the three-dimensional positions (absolute coordinates) of the scanning points corrected in Step S205, and ends the operation.

By using the survey system 1' of the present embodiment, in addition to the effect obtained in the first embodiment, a position of the scanner 3 (measurement reference point 3o of the scanner) can be accurately obtained with use of the surveying instrument 20, so that accuracy of the three-dimensional point group data can be further improved.

Third Embodiment

Figure 10A:
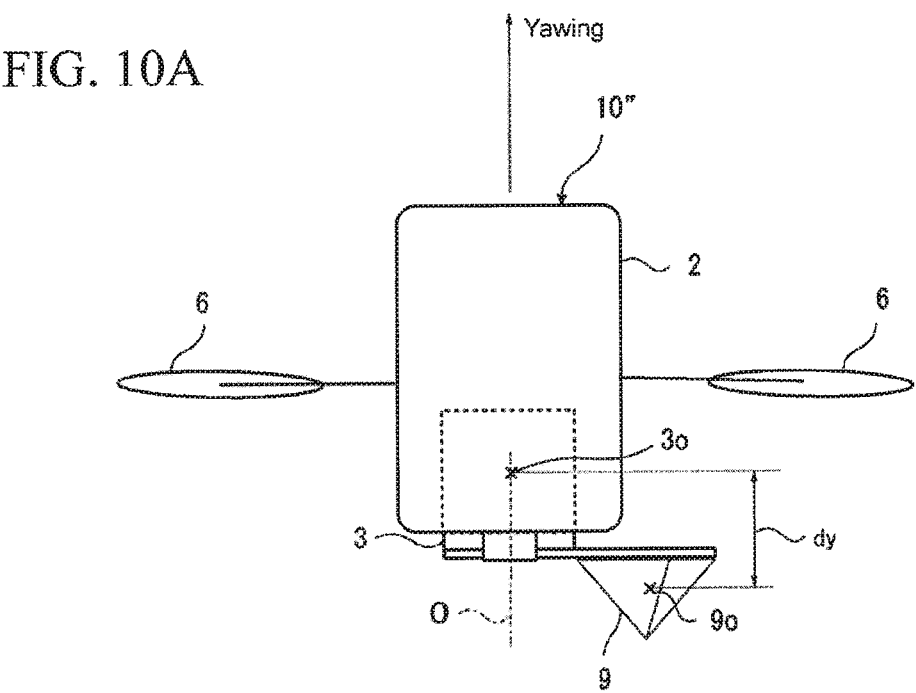
FIG. 10A is a side view of a surveying moving device of a survey system according to a third embodiment.
Figure 10B:
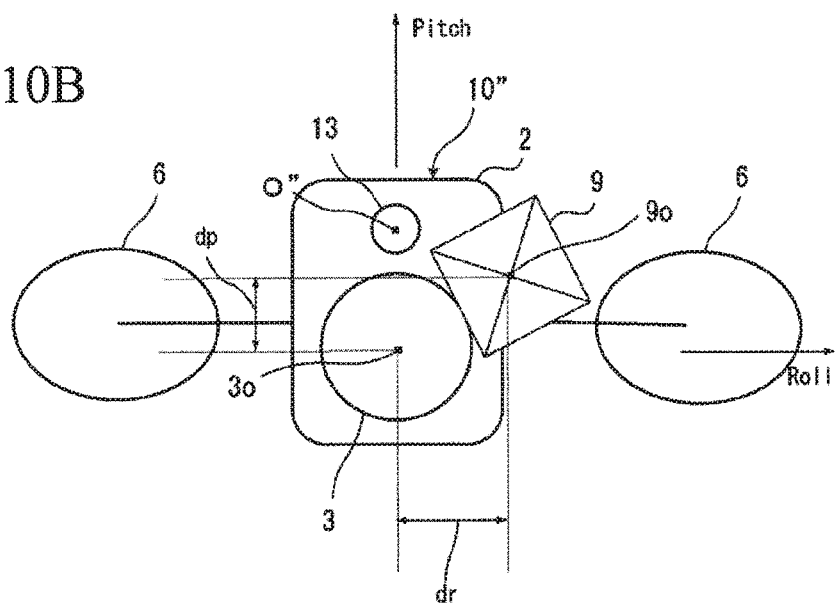
FIG. 10B is a bottom view of the same device.
Figure 11:
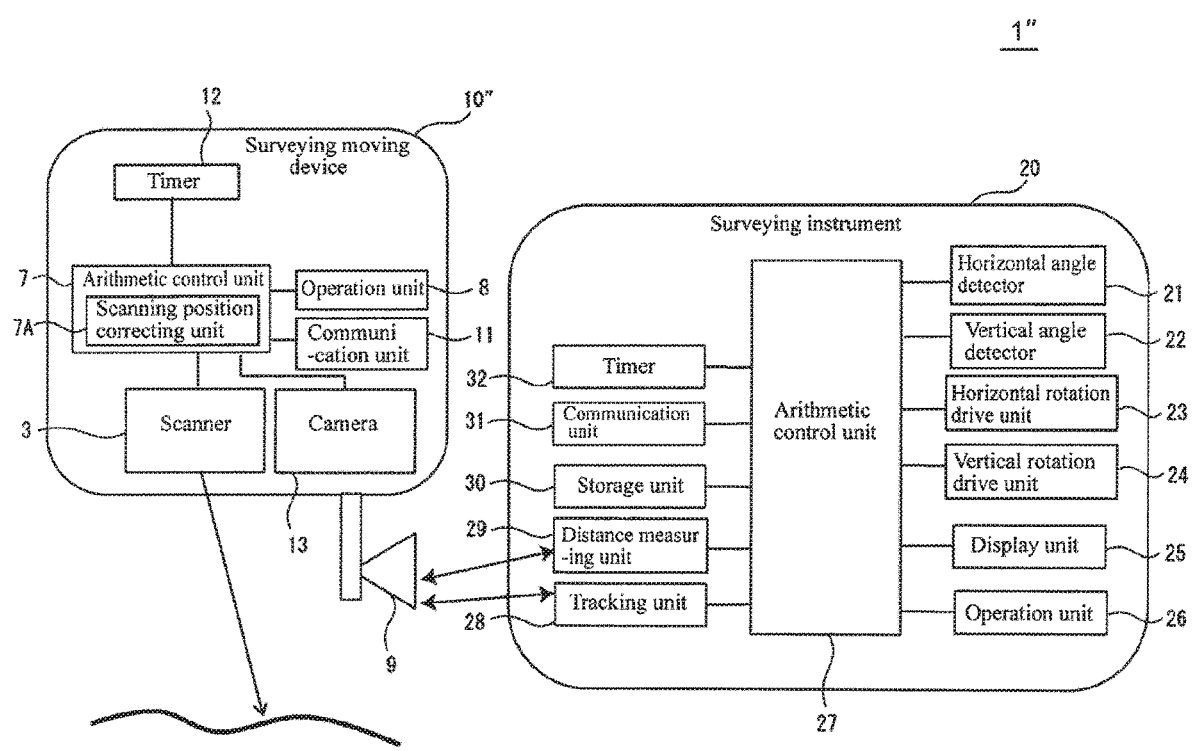
FIG. 11 is a control block diagram of the survey system according to the third embodiment.

Hereinafter, the same components as in the first or second embodiment are designated by the same reference signs, and descriptions thereof are omitted. An entire configuration diagram of a survey system 1" according to the third embodiment is the same as FIG. 6. FIG. 10 are configuration diagrams of a surveying moving device 10" according to a third embodiment, and FIG. 10A is a side view of the same device, and FIG. 10B is a bottom view of the same device. FIG. 11 is a control block diagram of the survey system 1".

As illustrated in FIG. 10, the survey system 1" includes the surveying moving device 10" and the surveying instrument 20. As illustrated in FIG. 10A and FIG. 10B, the surveying moving device 10" includes the mobile body 2, the scanner 3, the prism 9, and a camera 13 in place of the IMU 5. The prism 9 is fixed to a lateral side of a tip end of a lens portion of the scanner 3 as in the second embodiment. Deviations (dr, dp, dy) in the roll axis direction, the pitch axis direction, and the yaw axis direction between the measurement reference point 3o of the scanner 3 and the optical center 9o of the prism 9 are made known in advance of attachment of the prism 9.

The camera 13 is an image sensor such as a CCD sensor or a CMOS sensor, and a position of each pixel on an imaging element can be identified. For example, a position of each pixel on an image is identified by a coordinate system using an imaging optical axis O" of the camera 13 as an origin. The camera 13 is incorporated in the mobile body 2, and is fixed so as to be displaced from the mechanism of the scanner 3. The imaging optical axis O" of the camera 13 is set so as to be positioned vertically downward when the mobile body 2 is in a horizontal posture (refer to FIG. 10B). In the present embodiment, the camera 13 functions as a posture detecting device to detect a posture of the scanner 3.

A control system of the survey system 1" includes, as illustrated in FIG. 11, on the surveying moving device 10" side, the scanner 3, the arithmetic control unit 7, the operation unit 8, the communication unit 11, the timer 12, and the camera 13. The arithmetic control unit 7 acquires three-dimensional point group data (distances and angles to scanning points) from the scanner 3, and acquires image data from the camera 13. The arithmetic control unit 7 acquires a system time from the timer 12 at the timing of outputting a light transmission signal of the scanner 3, and provides the time to the three-dimensional point group data and the image data. The scanning position correcting unit 7A corrects a three-dimensional position obtained by the scanner 3 by a position and posture of the scanner. This is described in detail below. A control system on the surveying instrument 20 is the same as in the second embodiment.

Figure 12:
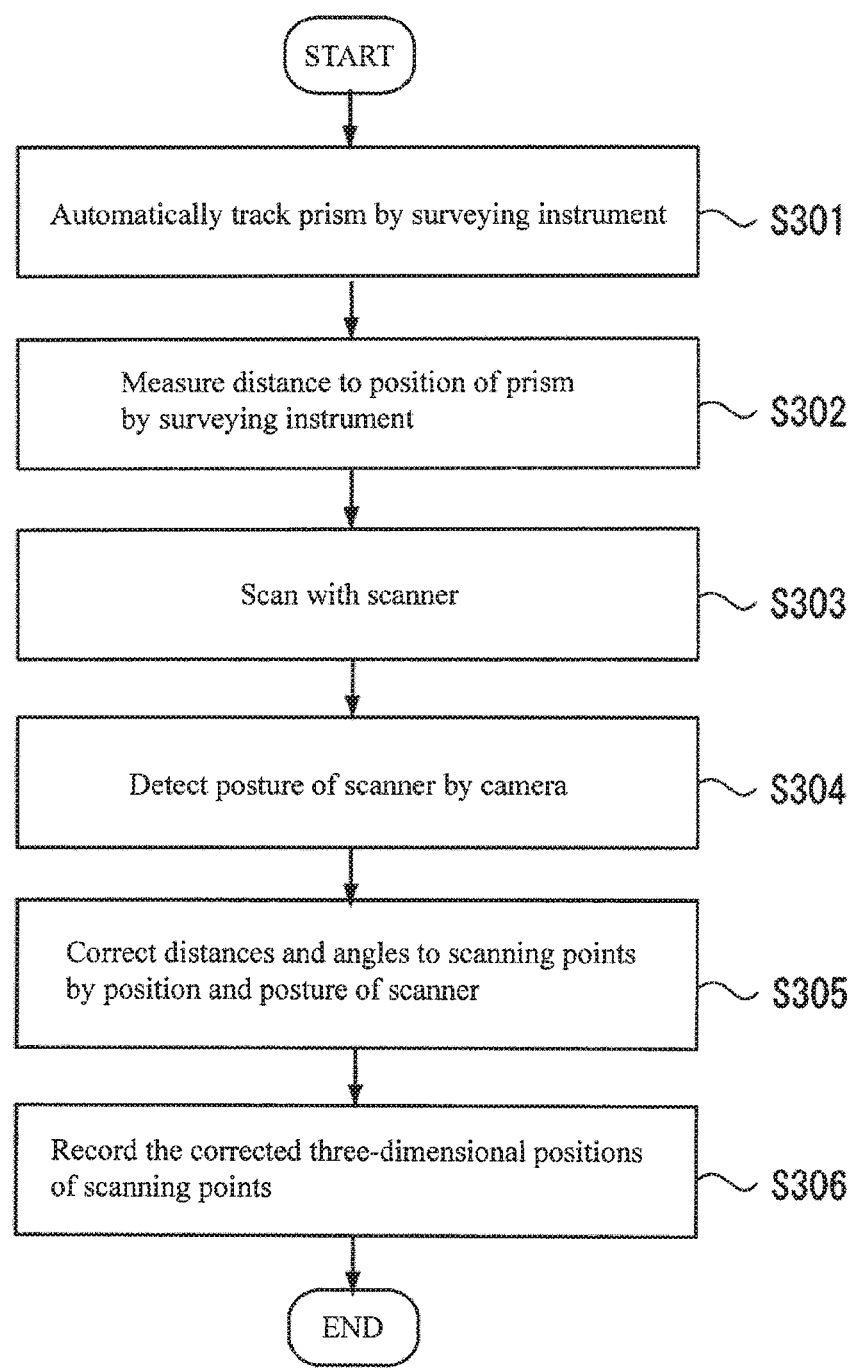
FIG. 12 is an operation flowchart of the survey system according to the third embodiment.

Next, an operation flow of the survey system 1" is described with reference to FIG. 12.

First, in Step S301, the surveying instrument 20 starts automatic tracking of the prism 9 of the surveying moving device 10".

Next, in Step S302, the surveying instrument 20 measures a distance and an angle to an automatically tracked position by the distance measuring unit 29 to measure a three-dimensional position (absolute coordinates) of the prism 9. The surveying instrument 20 transmits the three-dimensional position of the prism 9 to the surveying moving device 10".

Next, in Step S303, in parallel with Steps S301 and S302, the surveying moving device 10" performs a distance measurement and an angle measurement by the scanner 3 to measure three-dimensional positions of scanning points.

Next, in Step S304, in parallel with Steps S301 to S303, the surveying moving device 10" acquires image data by the camera 13. The arithmetic control unit 7 of the surveying moving device 10" photographically analyzes the image data to detect a posture (a roll angle, a pitch angle, and a yaw angle) of the camera 13. The camera 13 and the scanner 3 are integrated together, so that the posture of the camera 13 can be regarded as a posture of the scanner 3.

Next, in Step S305, the arithmetic control unit associates the positional information of the prism 9 obtained from the surveying instrument 20 in Step S302, the three-dimensional point group data of scanning points obtained from the scanner 3 in Step S303, and the posture information of the scanner obtained through the photographic analysis in Step S304 with each other by time. Then, the scanning position correcting unit 7A corrects the three-dimensional positions of the scanning points obtained in Step S303 by the position and posture of the scanner.

In detail, in Step S302, a position of the prism is precisely measured as absolute coordinates by the surveying instrument 20. In Step S304, an inclination (posture) of the scanner 3 is known. Therefore, the scanning position correcting unit 7A corrects the reference optical axis O of the scanner to a posture direction of the scanner, and re-calculates a distance and an angle to each scanning point measured by the scanner 3 by setting coordinates moved by the deviations (dr, dp, dy) from the coordinates of the prism 9 as a measurement reference point 3o of the scanner.

Last, in Step S306, the surveying moving device 10" stores the three-dimensional positions (absolute coordinates) of the scanning points corrected in Step S305, and ends the operation.

By using the survey system 1" of the present embodiment, in addition to the effects of the first and second embodiments, due to the use of the camera 13 for detection of a posture of the scanner 3, the system can be more inexpensively configured than in the case using a precision IMU.

Next, preferred modifications of the embodiments described above are shown.

(Modification 1)

Figure 13:
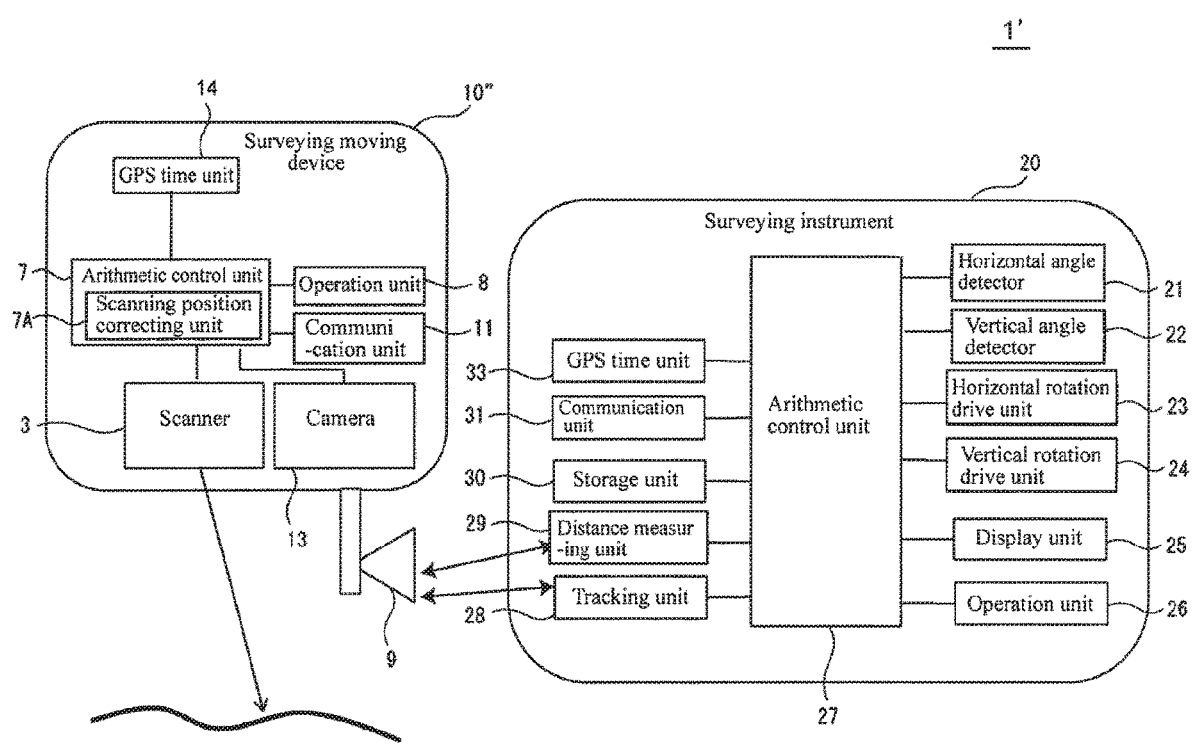
FIG. 13 illustrates a modification of the survey system according to the second embodiment.

In the second and third embodiments, the surveying moving device 10',10" and the surveying instrument 20 respectively include the timer 12 and the timer 32 for time synchronization, however, accurate time synchronization is preferably performed by the configuration described below. An example is shown by using the second embodiment. FIG. 13 illustrates a modification of the survey system 1' according to the second embodiment.

The surveying moving device 10' includes a GPS time unit 14 in place of the timer 12, and further includes a time synchronizing unit 15. The surveying instrument 20 includes a GPS time unit 33 in place of the timer 32.

Each of the GPS time unit 14 and the GPS time unit 33 includes a clock that receives a signal from a GPS satellite and generates a UTC and a PPS signal being a constant-frequency pulse. The GPS time unit 14 provides a first time to the three-dimensional point group data and the posture information of the scanner at the timing of outputting a light transmission signal of the scanner 3. The GPS time unit 33 provides a second time to the distance measurement and angle measurement values of the prism 9 at the timing of outputting a light transmission signal of the distance measuring unit 29.

After all scanning by the scanner 3 is finished, the time synchronizing unit 15 acquires the three-dimensional point group data given the first time from the arithmetic control unit 7, and acquires the distance measurement and angle measurement values of the prism 9 given the second time via the communication unit 11. When a survey period of the surveying instrument 20 is shorter (higher in frequency) than a scanning period of the scanner 3, the time synchronizing unit 15 extracts distance measurement and angle measurement values and three-dimensional point group data which are provided with a first time and a second time, respectively, matching each other, and associates the extracted distance measurement and angle measurement values of the prism 9 and the extracted three-dimensional point group data with each other. When there are no distance measurement and angle measurement values and three-dimensional point group data with a first time and a second time matching each other, a second time just before a certain first time and a second time just after the certain first time are extracted, and distance measurement and angle measurement values at a second time are calculated by interpolation. The above-described time synchronization can also be applied in a case where the survey period is longer (lower in frequency) than the scanning period.

(Modification 2)

Figure 14:
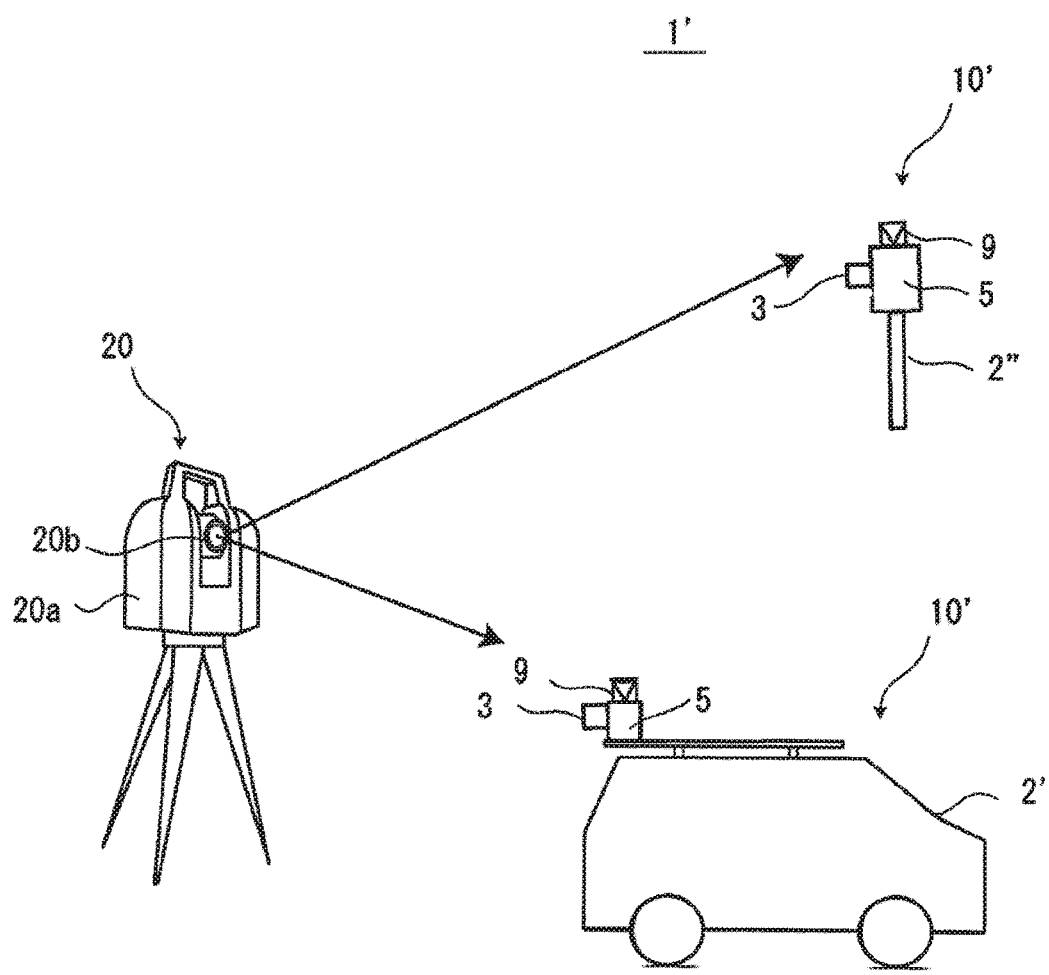
FIG. 14 illustrates another modification of the survey system according to the second embodiment.

In the second or third embodiment, the mobile bodies 2 of the surveying moving device 10',10" is a UAV, however, the mobile body 2 is only required to be movable in a survey site. An example is shown by using the second embodiment. FIG. 14 illustrates another modification of the survey system 1' according to the second embodiment. A mobile body 2' illustrated in FIG. 14 is a vehicle, and on the roof of the vehicle, a unit in which the scanner 3, the IMU 5, and the prism 9 are integrated is mounted. A mobile body 2" illustrated in FIG. 14 is a handheld housing, and to this housing, a unit in which the scanner 3, the IMU 5, and the prism 9 are integrated is attached. Even when the mobile body has this form, an effect equivalent to that of the second embodiment is obtained.

(Modification 3)

In the first or second embodiment, the surveying moving device 10, 10' may include, as its arbitrary element, a camera 13 to color three-dimensional point group data acquired by the scanner 3. In the third embodiment, the camera 13 is provided for posture detection of the scanner, however, it may also be used to color three-dimensional point group data.

In the embodiment including the camera 13, the scanner 3 can perform two-dimensional circular scanning as illustrated in FIG. 5A by freely deflecting the distance measuring light 3h', so that scanning according to an angle of view of the camera 13 is possible. A scanning range can be made to correspond to an image range of the camera 13, so that there is no waste in the scanning range, and a point group density of three-dimensional point group data in an image taken by the camera 13 can be increased.

(Modification 4)

In the first to third embodiments, the scanning position correcting unit 7A that corrects three-dimensional positions of scanning points by a position and a posture of the scanner is provided in the arithmetic control unit 7 of the surveying moving device, however, it may be provided in an information processing terminal (personal computer or the like).

(Modification 5)

In Step S202 of the second embodiment and Step S302 of the third embodiment, the surveying instrument 20 transmits the three-dimensional position of the prism 9 to the surveying moving device 10, however, it may transmit the three-dimensional position to a separate recording device. In addition, it is also possible that three-dimensional position group data of scanning points and posture information are also transmitted to a separate recording device and that each data is acquired by an information processing terminal and is corrected another day.

While embodiments and modifications of a preferred survey system of the present invention are described above, the respective embodiments and modifications can be combined based on knowledge of a person skilled in the art, and such combination modes are also included in the scope of the present invention.

Reference Signs List 1, 1',1" Survey system
2 Mobile body
3 Scanner
3a Emitting unit
3b Light receiving unit
3c Distance measuring unit
3f, 3g Risley prism (first optical axis deflecting unit)
3h Optical axis of distance measuring light
3h' Distance measuring light
3j, 3k Fresnel prism (second optical axis deflecting unit)
3l Light receiving optical axis of reflected distance measuring light
3l' Reflected distance measuring light
3m Emitting direction detecting unit
4 GPS device (position measuring device)
5 Inertial measurement unit (posture detecting device)
9 Prism
10, 10', 10" Surveying moving device
13 Camera (posture detecting device)
20 Surveying instrument (position measuring device)
28 Tracking unit

What is claimed is:

1. A survey system comprising a surveying moving device and a surveying instrument,
wherein the surveying moving device includes:
   a mobile body;
   a scanner including an emitting unit configured to emit a distance measuring light, a light receiving unit configured to receive a reflected distance measuring light, a distance measuring unit configured to perform a distance measurement based on an output of the light receiving unit, a first optical axis deflecting unit disposed on an optical axis of the distance measuring light and configured to deflect the distance measuring light, a second optical axis deflecting unit disposed on a light receiving optical axis of the reflected distance measuring light and configured to deflect the reflected distance measuring light at the same angle in the same direction as those of the first optical axis deflecting unit, and an emitting direction detecting unit configured to detect a deflection angle and a direction of the first optical axis deflecting unit and the second optical axis deflecting unit;
   a posture detecting device configured to detect a posture of the scanner;
   a position measuring device configured to measure a position of the scanner;
   a prism fixed to the mobile body; and
   a camera fixed to the mobile body, an imaging optical axis of the camera being set so as to be positioned vertically downward when the mobile body is in a horizontal posture, and
wherein the surveying instrument includes:
   a tracking unit for automatically tracking the prism; and
   a distance measuring unit for measuring a distance and an angle to the prism, and
   wherein the camera is a posture detecting device that detects a posture of the scanner, and the surveying instrument is a position measuring device that measures a position of the scanner.

2. The survey system according to claim 1, wherein, in the mobile body, deviations (dr, dp, dy) in a roll axis direction, a pitch axis direction, and a yaw axis direction between a measurement reference point of the scanner and an optical center of the prism are made known in advance,
   the surveying instrument tracks the prism and measures a three-dimensional position of the prism, and transmits the three-dimensional position of the prism to the surveying moving device, and
   the surveying moving device measures three-dimensional positions of scanning points of the scanner, photographically analyzes image data acquired by the camera, and detects a posture information (a roll angle, a pitch angle, and a yaw angle) of the camera, associates the three-dimensional position of the prism, the three-dimensional positions of point group data of scanning points, and the posture information of the scanner with each other by time information, and corrects a reference optical axis of the scanner to a posture direction of the scanner, and re-calculates a distance and an angle each of the scanning points by setting coordinates moved by the deviations (dr, dp, dy) from the coordinates of the prism as the measurement reference point of the scanner.

* * * * *